US008139333B2

(12) United States Patent
Imai et al.

(10) Patent No.: US 8,139,333 B2

(45) Date of Patent: Mar. 20, 2012

(54) SHORT CIRCUIT PROTECTION CIRCUIT

(75) Inventors: Takao Imai, Aichi (JP); Hiroshi Mori, Aichi (JP); Jun Ito, Toyota (JP); Hisao Niwa, Nagoya (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 363 days.

(21) Appl. No.: 12/420,516

(22) Filed: Apr. 8, 2009

(65) Prior Publication Data

US 2009/0257159 A1 Oct. 15, 2009

(30) Foreign Application Priority Data

Apr. 9, 2008 (JP) ................................ 2008-101630

(51) Int. Cl.

*H02H 3/00* (2006.01)
*H02H 5/00* (2006.01)
*H02H 3/06* (2006.01)

(52) U.S. Cl. ................ 361/59; 361/71; 361/72; 361/75; 361/93.4; 361/94

(58) Field of Classification Search .................... 361/59, 361/71, 72, 75, 93.4, 94

See application file for complete search history.

(56) References Cited

U.S. PATENT DOCUMENTS 3,826,889 A * 7/1974 Brukovsky et al. ....... 219/121.34
4,371,824 A * 2/1983 Gritter .......................... 318/722
5,400,206 A 3/1995 Barnes et al.
5,710,690 A * 1/1998 Bontempo et al. .............. 361/94
5,831,593 A 11/1998 Rutledge
6,130,813 A * 10/2000 Kates et al. .................. 361/93.1
7,079,368 B2 * 7/2006 Ishikawa et al. ............. 361/93.1
7,468,874 B1 * 12/2008 Guo ................................ 361/88
2002/0093360 A1 * 7/2002 Nagata ........................... 324/765
2008/0247107 A1 * 10/2008 Lin et al. ......................... 361/59

FOREIGN PATENT DOCUMENTS

CN 1164150 A 11/1997
JP 2001-25150 1/2001

OTHER PUBLICATIONS

Fig. 1 (prior art), prior to Apr. 8, 2009.

* cited by examiner

*Primary Examiner* — Jared Fureman
*Assistant Examiner* — Scott Bauer
(74) *Attorney, Agent, or Firm* — Patterson Thuente Christensen Pedersen, P.A.

(57) ABSTRACT

A short circuit protection circuit which readily recovers a relay drive circuit to an output operation state after a short circuit is cancelled while preventing the relay drive circuit from being damaged by a short circuit. The relay drive circuit outputs a drive current to a load in accordance with a first control signal. A short circuit detection circuit detects the occurrence of a short circuit at an output side of the relay drive circuit and suspends output operation of the relay drive circuit when a short circuit occurs. Further, the short circuit detection circuit intermittently transmits a recovery signal to the relay drive circuit in a certain time interval after a predetermined time elapses from when the short circuit occurs to recover the output operation of the relay drive circuit. The time interval is gradually increased whenever the recovery signal is transmitted.

9 Claims, 7 Drawing Sheets

SHORT CIRCUIT PROTECTION CIRCUIT

CROSS-REFERENCE TO RELATED APPLICATIONS

This application is based upon and claims the benefit of priority from the prior Japanese Patent Application No. 2008-101630, filed on Apr. 9, 2008, the entire contents of which are incorporated herein by reference.

BACKGROUND OF THE INVENTION

The present invention relates to a short circuit protection circuit for a relay arranged in an electronic device that is installed in a vehicle.

A relay drive circuit for an in-vehicle electronic device installed in a vehicle supplies a relay (load) with drive current based on an input control signal. When a short circuit occurs at the output side of the relay drive circuit, excessive short circuit current may flow to the relay drive circuit. This may damage the relay drive circuit.

Japanese Laid-Open Patent Publication No. 2001-25150 describes a short circuit protection circuit including a large current fuse located between a power supply and a relay drive circuit. The fuse melts and breaks when a short circuit occurs. Further, the short circuit protection circuit monitors the current flowing to the relay drive circuit and restricts the amount of the current to protect the relay drive circuit from damages caused by a short circuit.

One type of a short circuit protection circuit forcibly stops the output operation of a relay drive circuit when a short circuit occurs and prevents short circuit current from flowing to the relay drive circuit. After a predetermined time elapses from when the short circuit occurs, the short circuit transmits a recovery signal to the relay drive circuit in predetermined time intervals to recover the output operation of the relay drive circuit.

With reference to the timing chart of FIG. 1, in such a short circuit protection circuit, after predetermined time ΔTc3 elapses from when a short circuit occurs, recovery signals Re1 to Ren (where n is a natural number) are respectively transmitted in a predetermined time interval ΔT at times T1 to Tn ($\Delta T = T_{k+1} - T_k$, where k is a natural number; $1 \leqq k \leqq n$, where n is a natural number). This recovers the relay drive circuit to an output operation state.

If the recovery signals Re1 to Ren are transmitted (the recovery operations for recovering the relay drive circuit) too often, excessive short circuit current flows to the relay drive circuit when the operation of the relay drive circuit is temporarily recovered by the recovery signals Re1 to Ren. As a result, heat generated by the short circuit current is accumulated as time elapses. This may damage the relay drive circuit (transistors etc.). On the other hand, if the recovery signals Re1 to Ren are transmitted less frequently, recovery of the relay drive circuit from the short circuit state is delayed. This prolongs the time in which output from the relay drive circuit is stopped.

In FIG. 1, at time T2, the recovery signal Re2 is transmitted to the relay drive circuit to recover the output operation of the relay drive circuit. Further, the time ratio of the time [min] required from cancellation of the short circuit to recovery of the output operation relative to the time of the short circuit state [min] is 50%. In this case, the transmission frequency (number of transmissions) of the recovery signals Re1 to Ren is two and small. Further, there is no damage to the relay drive circuit. However, the time ratio is 50% and relatively long. Such a result is not satisfactory. In the example shown in FIG. 1, it is assumed that the relay drive circuit is damaged by the accumulation of heat generated by short circuit current when the recovery signal is transmitted to the relay drive circuit six times or more.

The relay drive circuit may be manually operated by a user of the vehicle (driver etc.) to recover the relay drive circuit from a short circuit state to an output operation state within a short period while preventing damage of the relay drive circuit. However, this would be inconvenient to the user.

SUMMARY OF THE INVENTION

The present invention provides a short circuit protection circuit and a short circuit protection method that prevents a relay drive circuit from being damaged by a short circuit while readily recovering the relay drive circuit to an output operation state after a short circuit is cancelled.

One aspect of the present invention is a short circuit protection circuit including a relay drive circuit which outputs a drive current to a load in accordance with a first control signal. A short circuit detection circuit detects the occurrence of a short circuit at an output side of the relay drive circuit, suspends an output operation of the relay drive circuit when the short circuit occurs, and intermittently transmits a recovery signal to the relay drive circuit in a certain time interval after a predetermined time elapses from when the short circuit occurs to recover the output operation of the relay drive circuit. The time interval is gradually increased whenever the recovery signal is transmitted.

A further aspect of the present invention is a short circuit protection circuit including a relay drive circuit which outputs a drive current to a load in accordance with a control signal. A short circuit detection circuit detects the occurrence of a short circuit at an output side of the relay drive circuit, suspends an output operation of the relay drive circuit when the short circuit occurs, and intermittently transmits a recovery signal to the relay drive circuit in a certain time interval after a predetermined time elapses from when the short circuit occurs to recover the output operation of the relay drive circuit. The time interval is gradually increased whenever the recovery signal is transmitted so that when D1 represents the time during which the short circuit is occurring and D2 represents the time from when the short circuit is cancelled to when the output operation of the relay drive circuit is recovered, a time ratio expressed by D2/D1 becomes less than or equal to a predetermined value.

Another aspect of the present invention is a short circuit protection circuit including a first relay drive circuit which outputs a first drive current to a load in accordance with a control signal. A second relay drive circuit outputs a second drive current to the load in accordance with the control signal. A first short circuit detection circuit detects the occurrence of a short circuit at an output side of the first relay drive circuit, suspends an output operation of the first relay drive circuit when the short circuit occurs, and intermittently transmits a first recovery signal to the first relay drive circuit in a first time interval after a first predetermined time elapses from when the short circuit occurs to recover the output operation of the first relay drive circuit. A second short circuit detection circuit detects the occurrence of a short circuit at an output side of the second relay drive circuit, suspends an output operation of the second relay drive circuit when the short circuit occurs, and intermittently transmits a second recovery signal to the second relay drive circuit in a second time interval after a second predetermined time elapses from when the short circuit occurs to recover the output operation of the second relay drive circuit. Transmission of the first recovery signal to the first relay drive circuit from the first short circuit detection circuit and transmission of the second recovery signal to the second relay drive circuit from the second short circuit detection circuit are alternately performed.

Still a further aspect of the present invention provides a method for protecting a relay drive circuit from damage caused by a short circuit, in which the relay drive circuit outputs a drive current to a load. The method includes detecting the occurrence of the short circuit between the load and the relay drive circuit, suspending an output operation of the relay drive circuit when the short circuit occurs, and intermittently transmitting a recovery signal to the relay drive circuit in a certain time interval after a predetermined time elapses from when the short circuit occurs to recover the output operation of the relay drive circuit. The intermittently transmitting a recovery signal includes gradually increasing the time interval whenever the recovery signal is transmitted so that when D1 represents the time during which the short circuit is occurring and D2 represents the time from when the short circuit is cancelled to when the output operation of the relay drive circuit is recovered, a time ratio expressed by D2/D1 becomes less than or equal to a predetermined value.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
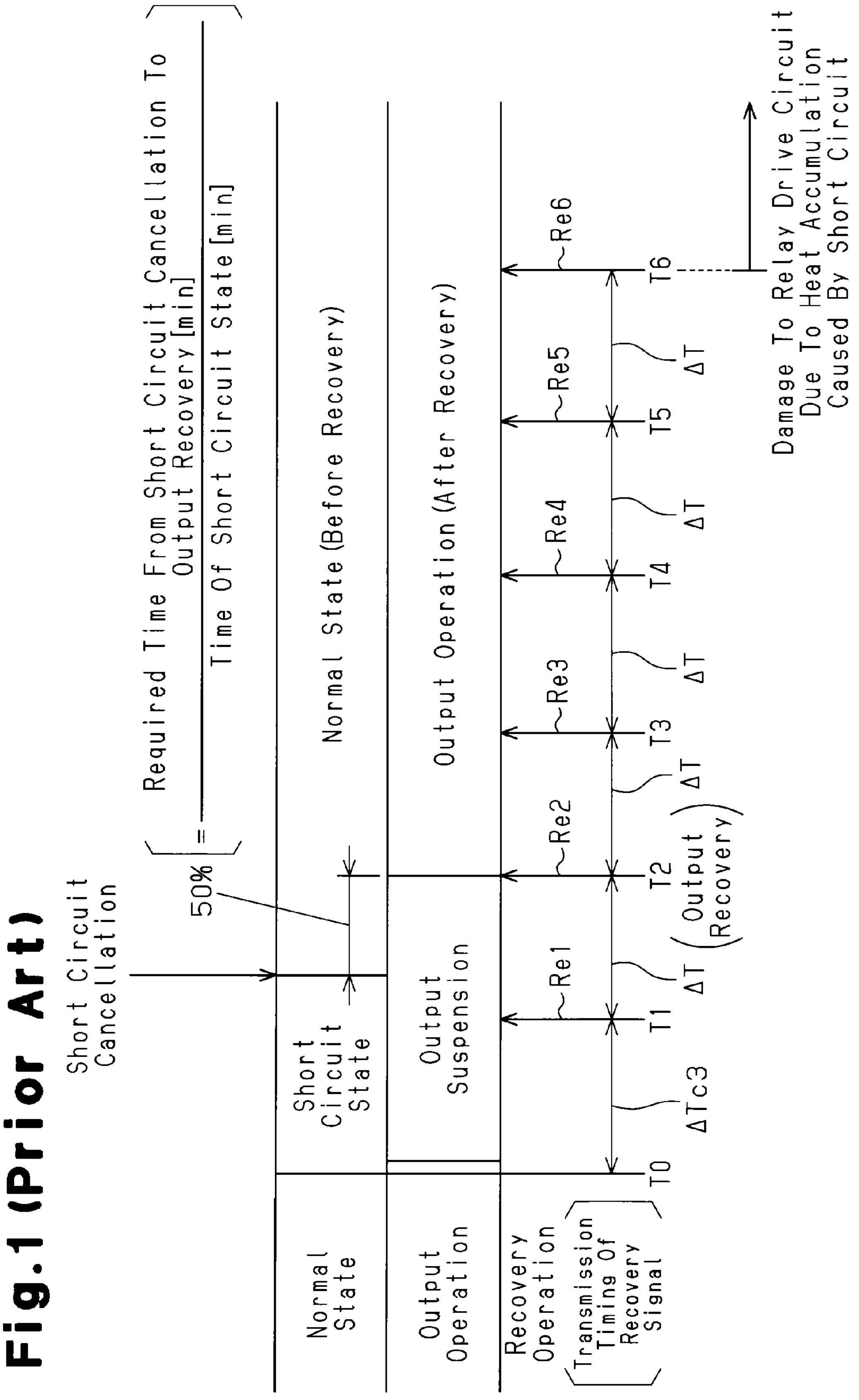
Fig.1 (Prior Art)
FIG. 1 is a timing chart showing the operation of an ECU in the prior art.

In the drawings, like numerals are used for like elements throughout.

Various embodiments of a short circuit protection circuit according to the present invention will now be discussed with reference to the drawings.

First Embodiment

Figure 2:
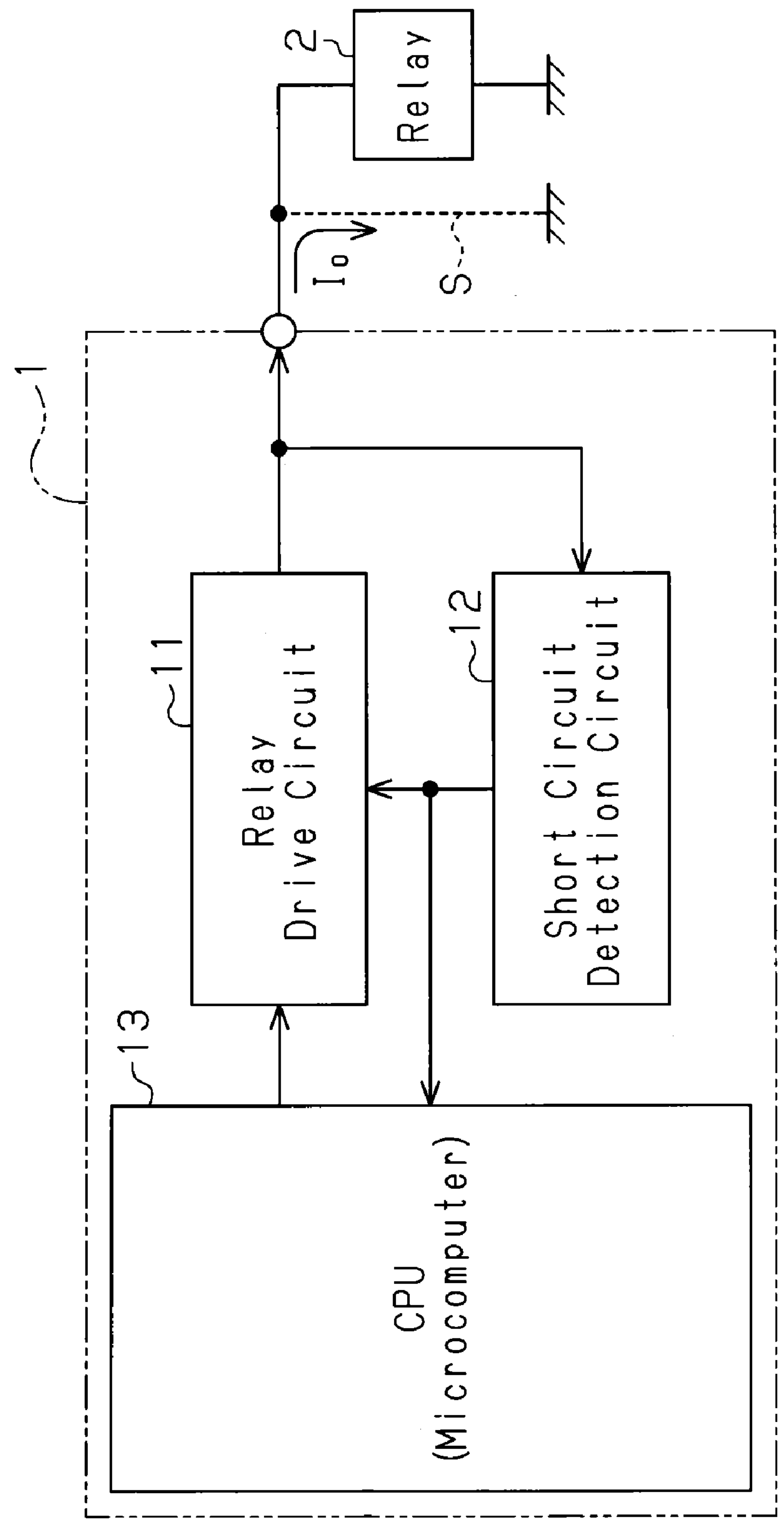
FIG. 2 is a schematic block diagram showing the electrical connection of a first embodiment of an ECU and a relay.

Referring to FIG. 2, in the first embodiment, an electronic control unit (ECU) 1 (controller), which functions as a short circuit protection circuit, is arranged in an in-vehicle electronic device, which is installed in a vehicle. The ECU 1 includes a relay drive circuit 11, a short circuit detection circuit 12, and a central processing unit (CPU) 13 (microcomputer). The relay drive circuit 11 outputs drive current, which flows to a relay 2, in response to a relay drive signal A, which serves as a first control signal. The short circuit detection circuit 12 detects a short circuit S (short circuit current $I_0$) at the output side of the relay drive circuit 11. The CPU 13 is connected to the relay drive circuit 11 and the short circuit detection circuit 12 to control the circuits 11 and 12.

Figure 3:
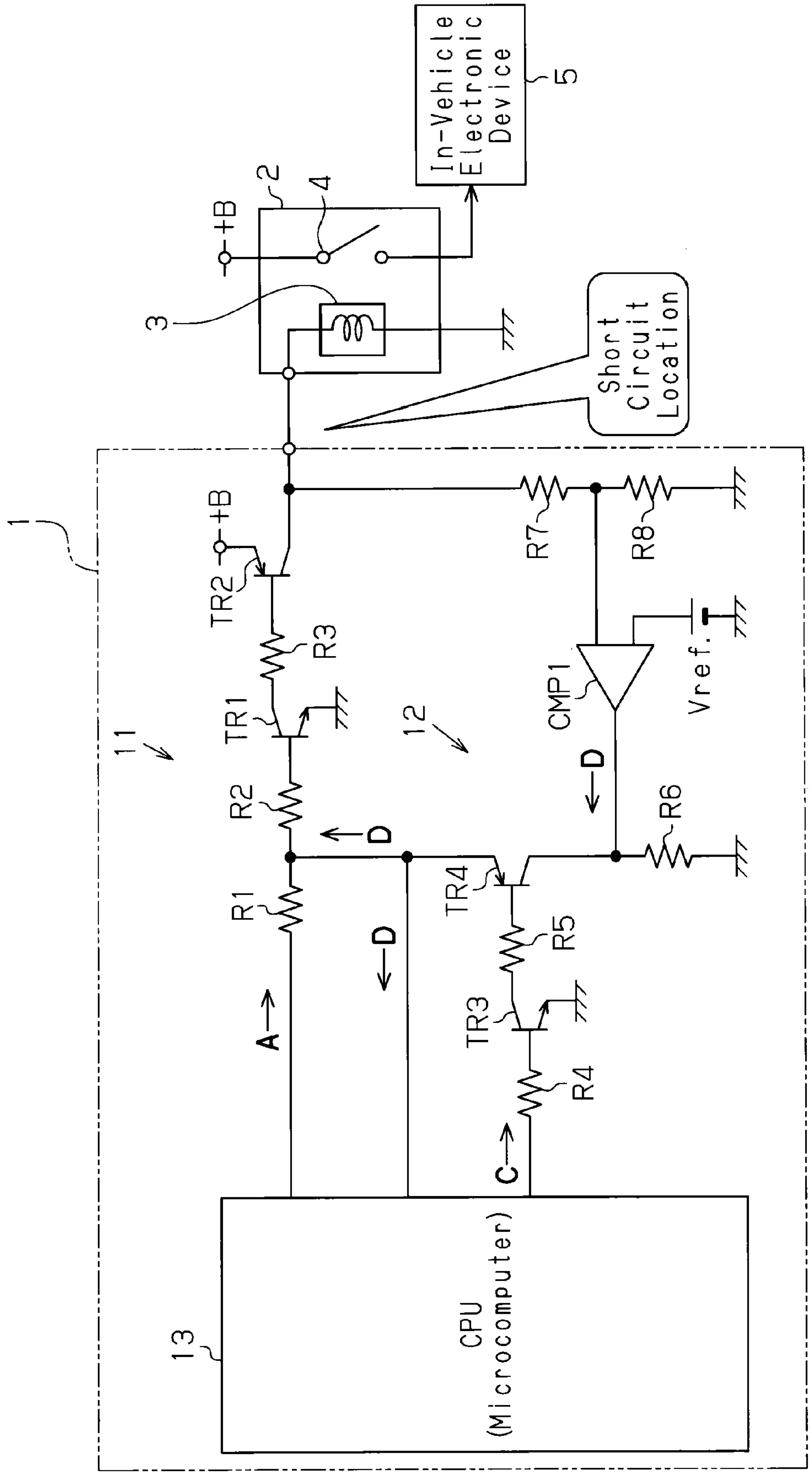
FIG. 3 is a circuit diagram showing in detail the electrical connection of the ECU in the first embodiment and the relay.

Referring to FIG. 3, the relay drive circuit 11 includes an npn transistor TR1, which has a base terminal connected to the CPU 13 via series-connected resistors R1 and R2, an emitter terminal connected to ground, and a collector terminal. The relay drive circuit 11 further includes a pnp transistor TR2, which has a base terminal connected to the collector terminal of the transistor TR1 via a resistor R3, an emitter terminal connected to a DC power supply (+B), and a collector terminal connected to the relay 2. The collector terminal of the transistor TR2 is also connected to ground via resistors R7 and R8. The relay 2, which is connected to the collector terminal of the transistor TR2, includes a relay coil 3 and a relay contact 4. The relay coil 3 serves as a load excited by drive current flowing from the relay drive circuit 11. The relay contact 4 is driven by the relay coil 3 to connect and disconnect an in-vehicle electronic device 5 (external load) to the in-vehicle DC power supply (+B).

The short circuit detection circuit 12 includes an npn transistor TR3, which has a base terminal connected to the CPU 13 via a resistor R4, an emitter terminal connected to ground, and a collector terminal. Further, the short circuit detection circuit 12 includes a pnp transistor TR4, which has a base terminal connected to the collector terminal of the transistor TR3 via a resistor R5, an emitter terminal connected to the CPU 13 and a node between the resistors R1 and R2, and a collector terminal connected to ground via a resistor R6. In the first embodiment, the transistor TR4 and the resistor R6 forms a signal control circuit that functions as a pull down circuit.

The short circuit detection circuit 12 also includes a comparator CMP1, which compares the potential between the resistors R7 and R8 with the potential of a reference voltage Vref and selectively outputs two types of voltages, high ($V_H$) and low ($V_L$), in accordance with the comparison. The resistors R7 and R8 are connected in series between ground and a node between the relay coil 3 and the collector terminal of the transistor TR2.

When a short circuit occurs at the output side of the relay drive circuit, that is, at a connection between the collector terminal of the transistor TR2 and the relay coil 3, the potential between the resistors R7 and R8 (input terminal voltage Vi of the comparator CMP1) becomes less that a reference voltage Vref. In this case, the comparator CMP1 generates an output terminal voltage Vo as the low voltage $V_L$ and outputs voltage Vo ($Vo=V_L$) to between the transistor TR4 and the resistor R6. When a short circuit is cancelled at a connection between the collector terminal of the transistor TR2 and the relay coil 3, the potential between the resistors R7 and R8 (input terminal voltage Vi of the comparator CMP1) becomes greater than or equal to the reference voltage Vref. In this case, the comparator CMP1 generates an output terminal voltage Vo as the high voltage $V_L$ ($Vo=V_H$).

In the first embodiment, the short circuit detection circuit 12 uses the comparator CMP1 to detect a short circuit at a connection between the collector terminal of the transistor TR2 and the relay coil 3, that is, at the output side of the relay drive circuit 11. Based on the detection result, the short circuit detection circuit 12 enables or suspends the transmission of the relay drive signal A to the relay drive circuit 11 from the CPU 13. The relay drive signal A, which is amplified by the transistor TR1 and TR2, functions as a drive current for driving the relay 2.

When the output voltage Vo of the comparator CMP1 is the low voltage $V_L$ (Vo=$V_L$), the low voltage $V_L$ is used as a forcible suspension signal D and transmitted to the CPU 13 and a node between the resistors R1 and R2 (accordingly, the base terminal of the transistor TR1) under predetermined conditions. The forcible suspension signal D forcibly suspends the output of the drive current from the relay drive circuit 11 when the short circuit detection circuit 12 detects a short circuit (short circuit state).

When the forcible suspension signal D is transmitted to the CPU 13, the CPU 13 controls the transmission of a suspension permission signal C (second control signal) to the short circuit detection circuit 12 (transistor TR3). The suspension permission signal C is a signal for permitting the short circuit detection circuit 12 to suspend the transmission of the relay drive signal A to the relay drive circuit 11 from the CPU 13. In other words, the suspension permission signal C is used to permit the transmission of the forcible suspension signal D from the short circuit detection circuit 12 to the relay drive circuit 11. For example, when receiving the forcible suspension signal D, the CPU 13 intermittently suspends the transmission of the suspension permission signal C in predetermined time intervals. Alternatively, the CPU 13 may shift the voltage level of the suspension permission signal C.

When the suspension permission signal C for the relay drive signal A is transmitted from the CPU 13 to the short circuit detection circuit 12, the output terminal voltage Vo of the comparator CPM1 is applied to the base terminal of the transistor TR1 via the transistor TR4. As described above, in a short circuit state in which a short circuit occurs in the relay drive circuit 11 and the short circuit is detected by the short circuit detection circuit 12, Vo=$V_L$ is satisfied, and the low voltage $V_L$ functions as a forcible suspension signal D. Accordingly, the forcible suspension signal D is transmitted to the node between the resistors R1 and R2 when VO=$V_L$ is satisfied. As a result, the voltage at the node between the resistors R1 and R2 becomes low due to the forcible suspension signal D, and transmission of the relay drive signal A is blocked (forcibly suspended). If the short circuit is spontaneously cancelled, the relay drive circuit 11 becomes normal. In this state, the short circuit detection circuit 12 no longer detects the short circuit, Vo=$V_H$ is satisfied, and the forcible suspension signal D is eliminated. Accordingly, the voltage at the node between the resistors R1 and R2 becomes high, and the CPU 13 provides the transistor TR1 of the relay drive circuit 11 with the relay drive signal A via the resistors R1 and R2.

When the CPU 13 is suspending transmission of the suspension permission signal C to the short circuit detection signal 12 (or when the CPU 13 is not transmitting the suspension permission signal C), the output terminal voltage Vo of the comparator CMP1 is not applied to the base terminal of the transistor TR1. This is because the transistors TR3 and TR4 are deactivated when the CPU 13 is not outputting the suspension permission signal C. Accordingly, the relay drive signal A is transmitted from the CPU 13 to the relay drive circuit 11 (transistor TR1) regardless of the level of the output terminal voltage Vo (regardless of whether or not the forcible suspension signal D is present).

Figure 4:
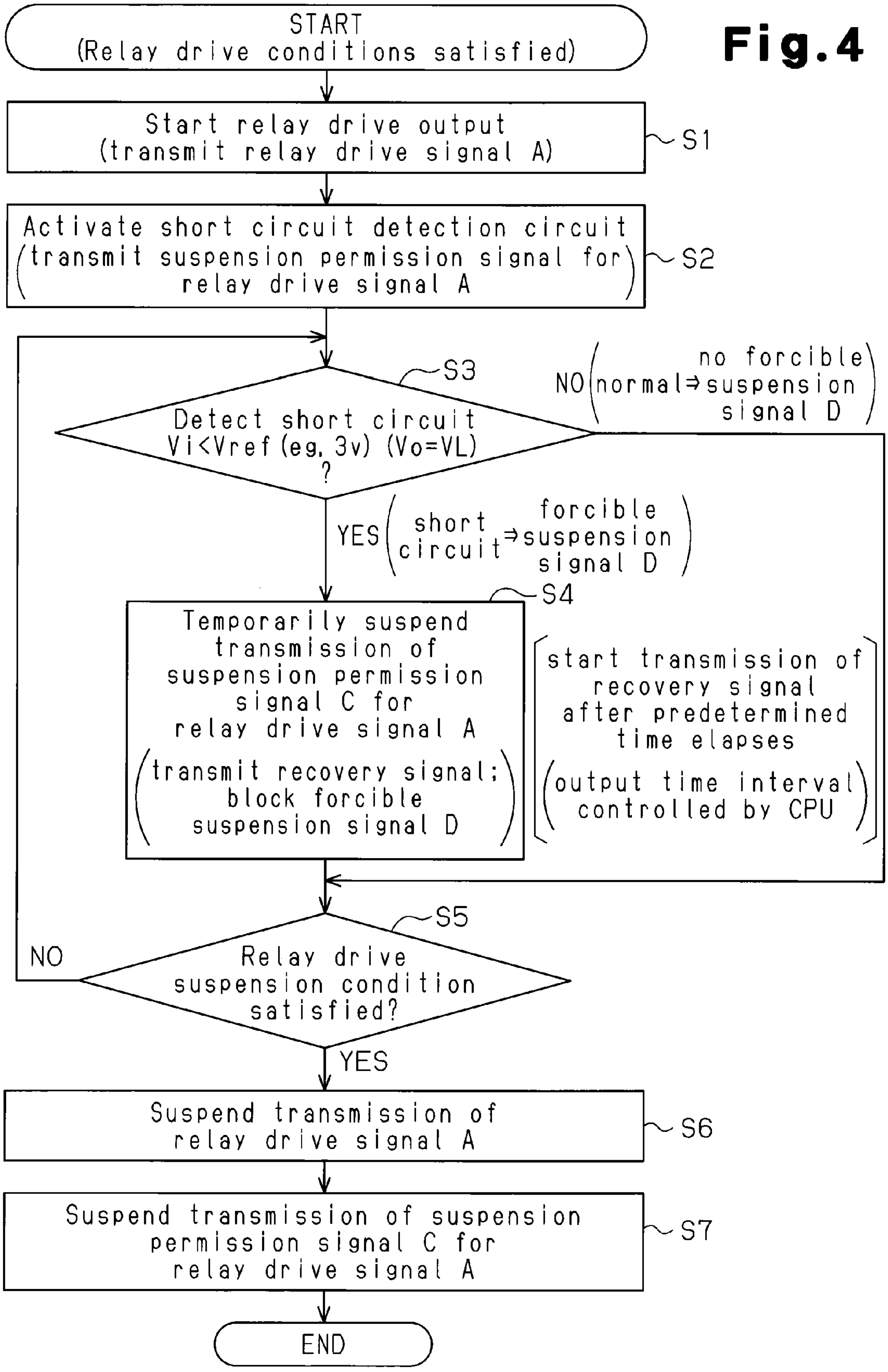
FIG. 4 is a schematic flowchart showing the operation of the ECU in the first embodiment.

With reference to the flowchart of FIG. 4 and the timing chart of FIG. 5, the operation of the ECU 1 (short circuit protection circuit) in the first embodiment will now be discussed in detail.

In a state in which the relay drive signal A is not transmitted from the CPU 13, the suspension permission signal C is also not transmitted. In such a state, when a user of the vehicle (driver etc.) operates a switch to activate the in-vehicle electronic device 5 (refer to FIG. 3), the relay drive conditions are satisfied for the CPU 13. Then, referring to FIG. 4, the ECU 1 starts step S1.

In step S1, the CPU 13 transmits the relay drive signal A to the relay drive circuit 11. The transistors TR1 and TR2 amplify the relay drive signal A to a drive current having a predetermined level. The drive current is then output to the relay 2 (relay coil 3).

Next, in step S2, the CPU 13 transmits the suspension permission signal C to the short circuit detection circuit 12. This activates the short circuit detection circuit 12.

In step S3, the short circuit detection circuit 12 determines whether or not a short circuit detection circuit 12 is occurring. The comparator CMP1 performs the short circuit detection in step S3 by intermittently comparing its input terminal voltage Vi with the reference voltage (e.g., Vref=3[V]). When intermittent short circuiting is occurring in the relay drive circuit 11, as described above, Vi<Vref is satisfied, and the output terminal voltage Vo of the comparator CMP1 becomes the low voltage $V_L$. As a result, the forcible suspension signal D ($V_L$) for the relay drive signal A is transmitted, the voltage between the resistors R1 and R2 becomes low, and the relay drive signal A is blocked (forcibly suspended). In this case (YES in step S3), the processing advances to step S4, If the short circuit is spontaneously cancelled and the relay drive circuit 11 returns to a normal state, Vi≧Vref is satisfied, and the output terminal voltage Vo of the comparator CMP1 becomes the high voltage $V_H$. As a result, the forcible suspension signal D is eliminated, the CPU 13 starts transmitting the relay drive signal A again to the relay drive circuit 11, and the output operation of the relay drive circuit 11 is recovered. In this case (NO is step S3), the processing advances to step S5.

In step S4, the low voltage $V_L$ serving as the forcible suspension signal D is transmitted to the CPU 13 in addition to the relay drive circuit 11, and the CPU 13 that receives the forcible suspension signal D controls transmission of the suspension permission signal C. For example, the CPU 13 temporarily suspends transmission of the suspension permission signal C in response to the forcible suspension signal D. Accordingly, the output terminal voltage Vo of the comparator CMP1 is not applied to the node between the resistors R1 and R2. As a result, even if a short circuit state continues, the CPU 13 transmits the relay drive signal A to the relay drive circuit 11 so as to temporarily recover the operation of the relay drive circuit 11.

In this manner, after a predetermined time interval from when the forcible suspension signal D is transmitted to the CPU 13, the transmission of the suspension permission signal C from the CPU 13 to the short circuit detection circuit 12 is temporarily (instantaneously) suspended, and the operation of the relay drive circuit 11 is temporarily recovered. Thus, the short circuit detection circuit 12 functions in the same manner as if the CPU 13 would transmit a recovery signal for temporarily recovering the operation of the relay drive circuit 11. In other words, instead of the CPU 13, the short circuit detection circuit 12 transmits a recovery signal (recovery signals Re1 to Ren, which will be described later) to the relay drive circuit 11. Further, when the recovery circuit is transmitted to the relay drive circuit 11, current flows from the DC power supply (+B) to the relay drive circuit 11 (refer to FIG.

3). This enables determination of whether or not a short circuit is occurring at an output side of the relay drive circuit 11.

If the recovery operation is performed in a state in which a short circuit is continuously occurring in the relay drive circuit 11, excessive short circuit current $I_0$ (refer to FIG. 2) would flow from the DC power supply to the short-circuited location and heat the transistor TR2. Further, repetition of the recovery operation would cause heat to accumulate from the short circuit current $I_0$ in the resistor R2. This may damage the relay drive circuit 11. In the first embodiment, as shown in FIG. 5 and in the same manner as in the prior art, it is assumed that when the recovery signal is transmitted to the relay drive circuit 11 six times or more, heat accumulation from the short circuit $I_0$ damages the relay drive circuit 11.

The operational features of the ECU 1 (particularly, the operation of step S4) will now be described in detail with reference to the timing chart of FIG. 5.

When a short circuit occurs S at the output side of the relay drive circuit 11, the forcible suspension signal D generated by the comparator CMP1 is transmitted to the CPU 13 and the node between the resistors R1 and R2 (i.e., relay drive circuit 11) via the transistor TR4. This suspends the transmission of the relay drive signal A to the relay drive circuit 11 with the forcible suspension signal D. As a result, the output of the drive current from the relay drive circuit 11 to the relay 2 is suspended.

Subsequently, the CPU 13 controls the transmission of the suspension permission signal C to the short circuit detection circuit 12 when receiving the forcible suspension signal D. For example, a short circuit occurs at time T0 (time in which the CPU 13 receives the forcible suspension signal D). Starting from time T1, which is when a predetermined time ΔTc1 elapses from time T0, the CPU 13 temporarily suspends transmission of the suspension permission signal C to the short circuit detection circuit 12 at times T1 to Tn. As a result, the short circuit detection circuit 12 transmits the recovery signals Re1 to Ren (where n is a natural number) to the relay drive circuit 11 at times T1 to Tn, respectively. As previously described, the recovery signals Re1 to Ren are generated at the node between the resistors R1 and R2 by deactivating the transistor TR4 at times T1 to Tn so as to temporarily suspend the transmission of the forcible suspension signal D to the relay drive circuit 11. Thus, the short circuit detection circuit 12 can transmit the forcible suspension signal D to the relay drive circuit 11 as the recovery signals Re1 to Ren. The time intervals ΔT1 to ΔTn (where n is a natural number) of times T1 to Tn are adjustable by the CPU 13. In the first embodiment, the CPU 13 gradually increases the time interval $\Delta T_k$ ($\Delta T_k = T_{k+1} - T_k$, $\Delta T_{k+1} - \Delta T_k > 0$) whenever a recovery signal Rek (where k is a natural number, $1 \leqq k \leqq n$) is transmitted. As a result, the time ratio expressed by D2/D1, in which D1 represents the time during which a short circuit is occurring (short circuit state time [min]), and D2 represents the time from when the short circuit is cancelled to when the output operation of the relay drive circuit 11 is recovered (time [min] required for short circuit cancellation to output recovery), is improved in comparison with the prior art (refer to the example of FIG. 7). Preferably, the CPU 13 sets the time interval $\Delta T_k$ based on the equation of $\Delta T_{k+1} = a \cdot \Delta T_k$ (where a is a constant, a>1) so that the time ratio expressed by D2/D1 becomes less than or equal to a predetermined value (e.g., 10%). Here, ΔTc1, ΔT1, and constant a are determined in accordance with the assumed time of a short circuit state.

Figure 5:
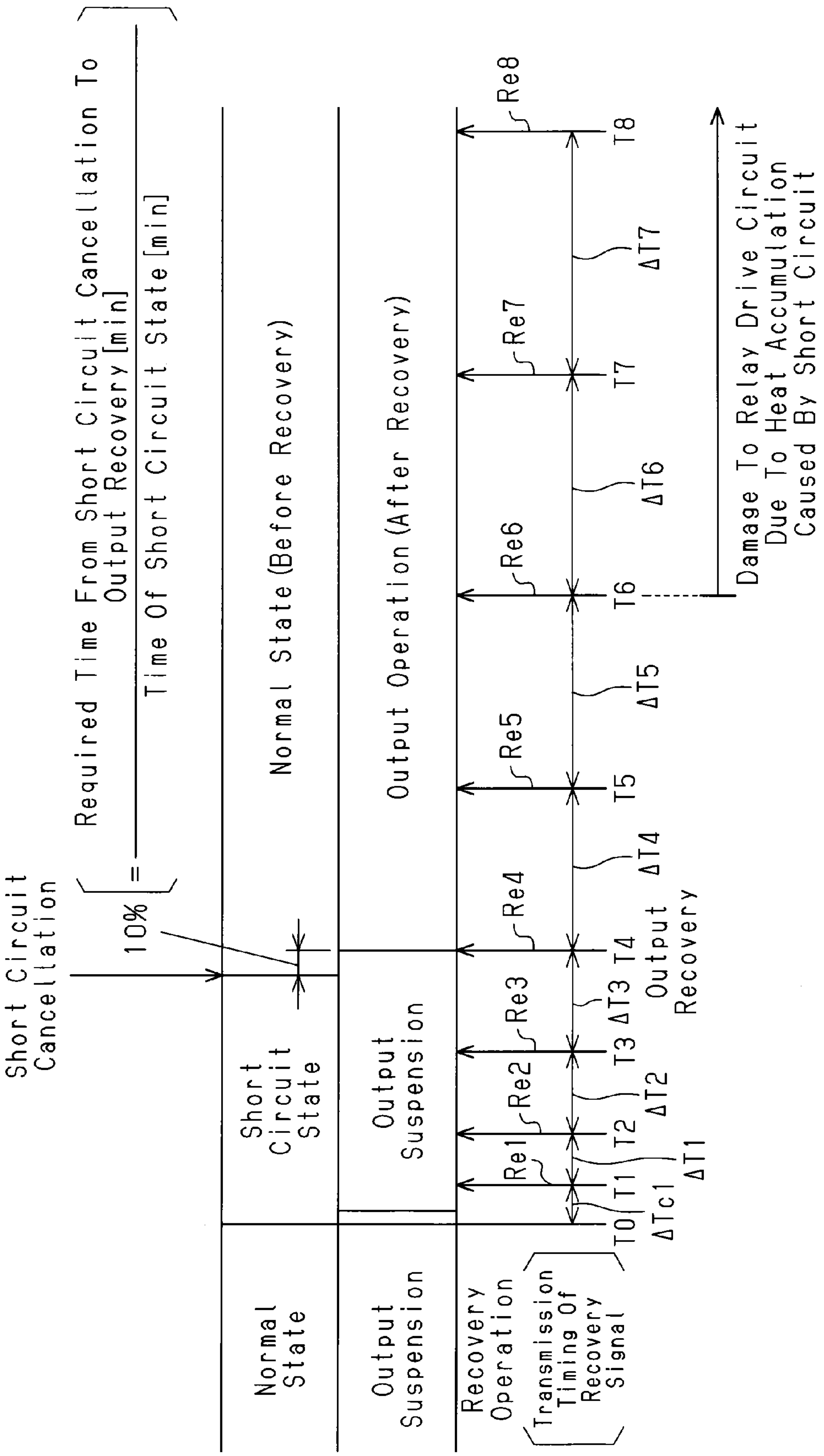
FIG. 5 is a schematic timing chart showing the operation of the ECU in the first embodiment.

In the example shown in FIG. 5, after a short circuit is spontaneously cancelled and a normal state is recovered, the output operation of the relay drive circuit 11 is recovered when the short circuit detection circuit 12 transmits to the relay drive circuit 11 the recovery signal Re4, which is transmitted at time T4 and is the fourth one of the signals transmitted from time T1. In this state, the recovery operation of the relay drive circuit 11 has been performed four times. Since the recovery operation has been performed only for a frequency of four times, which is less than six times and thus a small number, the relay drive circuit 11 is not damaged. In addition, the time ratio of the time [min] required from short circuit cancellation to output recovery relative to the time of the short circuit state [min] is 10% or less. Thus, the time ratio is small and satisfactory.

Returning to FIG. 4, at subsequent S5, the CPU 13 transmits the relay drive signal A and the suspension permission signal C to drive the relay 2 with the relay drive circuit 11. In this state, when the vehicle user operates a switch to deactivate the in-vehicle electronic device (refer to FIG. 3), the relay drive suspension condition is satisfied for the CPU 13. In step S5, when the relay drive suspension condition is not satisfied, the processing returns to step S3, and the short circuit detection circuit continues to determine the occurrence of a short circuit, while the relay 2 is being driven by the relay drive circuit 11. If the relay drive suspension condition is satisfied in step S5, the CPU 13 suspends the transmission of the relay drive signal A in step S6. Further, in step S7, transmission of the suspension permission signal C for the relay drive signal A is suspended. This ends the series of operations performed by the ECU 1.

The ECU 1 (short circuit protection circuit) of the first embodiment has the advantages described below.

(1) After the predetermined time ΔTc1 elapses from when a short circuit occurs, the recovery signals Re1 to Ren (where n is a natural number) are transmitted to the relay drive circuit at the time intervals ΔT1 to ΔTn (where n is a natural number). The time intervals ΔT1 to ΔTn are gradually increased as time elapses so that the time [min] required for short circuit cancellation to output recovery relative to the short circuit state time [min] becomes less than or equal to a predetermined value, preferably 10%. Accordingly, the recovery signals Re1 to Ren are more frequently transmitted at the beginning of a short circuit. Thus, the output operation state of the relay drive circuit 11 is recovered within a short period of time from when the output is suspended. Further, the recovery signals Re1 to Ren are transmitted less frequently as time elapses. This decreases the heat accumulated in the relay drive circuit 11 by the short circuit current $I_0$ and effectively prevents the relay drive circuit 11 from being damaged.

(2) The hardware structure including the relay drive circuit 11 and the short circuit detection circuit 12 is simple. Accordingly, the detection of a short circuit in the relay drive circuit 11 and recovery of the output operation state in the relay drive circuit 11 from the short circuit state are performed readily and automatically in an ensured manner without relying on software stored in a memory or the like of the CPU 13. This improves convenience for the vehicle user (driver etc.).

Second Embodiment

Figure 6:
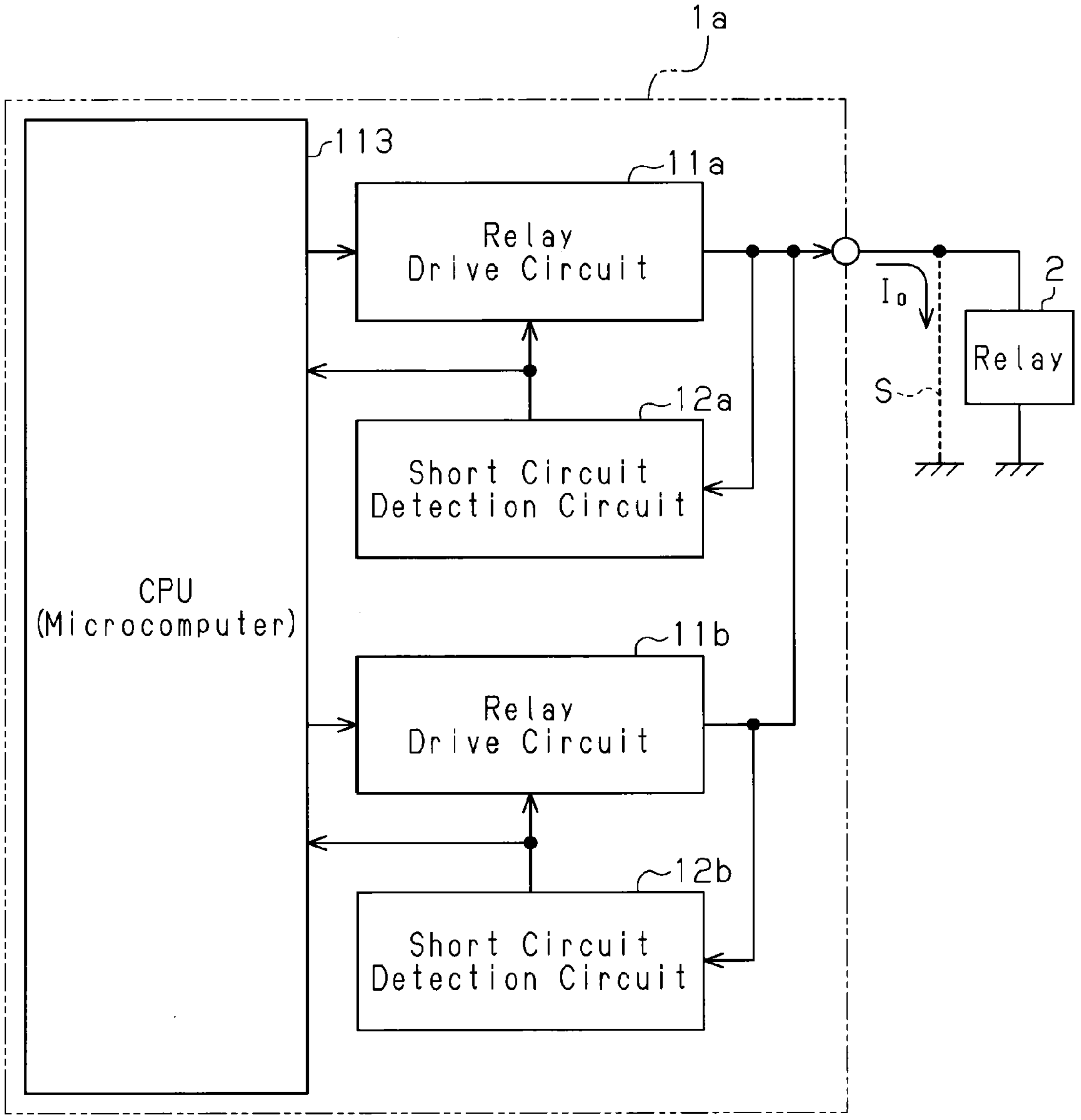
FIG. 6 is a schematic block diagram showing the electrical connection of a second embodiment of an ECU and a relay.

Referring to FIG. 6, in the second embodiment, an ECU la (controller) functioning as a short circuit protection circuit is arranged in an in-vehicle electronic device installed in a vehicle. The ECU la includes two relay drive circuits 11*a* and 11*b*, two short circuit detection circuits 12*a* and 12*b*, and a CPU 113. The relay drive circuits 11*a* and 11*b* each output drive current to a relay 2 based on an input relay drive signal A (control signal). The short circuit detection circuits 12*a* and 12*b* detect the occurrence of a short circuit S (short circuit current $I_0$) at the output sides of the relay drive circuits 11*a* and 11*b*, respectively. The CPU 113, which functions as a controller, is connected to the relay drive circuits 11*a* and 11*b* and the short circuit detection circuits 12*a* and 12*b* to control the circuits 11*a*, 12*a*, 11*a*, and 11*b*. In this manner, the ECU 1*a* includes a plurality of (two in FIG. 6) short circuit protection units, with each unit including the relay drive circuit 11*a* (11*b*) and the short circuit detection circuit 12*a* (12*b*).

In the ECU 1*a* of the second embodiment, the structures and basic operations of the relay drive circuits 11*a* and 11*b* and the short circuit detection circuits 11*a* and 11*b* are similar to the relay drive circuit 11 and the short circuit detection circuit 12 of the first embodiment. Thus, electric elements corresponding to those of the first embodiment, such as transistors and resistors, are given the same reference numbers and will not be described in detail.

The operational features of the ECU 1*a* will now be described in detail with reference to the timing chart of FIG. 7.

When a short circuit occurs S at the output sides of the relay drive circuits 11*a* and 11*b*, the forcible suspension signal D generated by a comparator CMP1*a*, which is arranged in the short circuit detection circuit 12*a*, is transmitted to the CPU 113 and the node between the resistors R1 and R2 (i.e., relay drive circuit 11*a*) via a transistor TR4*a*. In the same manner, the forcible suspension signal D generated by a comparator CMP1*b*, which is arranged in the short circuit detection circuit 12*b*, is transmitted to the CPU 113 and the node between the resistors R1 and R2 (i.e., relay drive circuit 11*b*) via a transistor TR4*b*. This suspends the transmission of the relay drive signal A to the relay drive circuits 11*a* and 11*b* with the forcible suspension signal D. As a result, the output of the drive current from the relay drive circuits 11*a* and 11*b* to the relay 2 is suspended.

Subsequently, when receiving the forcible suspension signal D, the CPU 113 controls the transmission of the suspension permission signal C to the short circuit detection circuit 12*a* and the transmission of the suspension permission signal C to the short circuit detection circuit 12*b*. For example, a short circuit occurs at time T0 (time in which the CPU 113 receives the forcible suspension signal D). Starting from time Ta1, which is when a predetermined time ΔTc2 elapses from time T0, the CPU 113 temporarily suspends transmission of the suspension permission signal C to the short circuit detection circuits 12*a* and 12*b* at times Ta1 to Tan and Tb1 to Tbn. As a result, the short circuit detection circuits 12*a* and 12*b* alternately transmit the recovery signals Ra1 to Ran and Rb1 to Rbn (where n is a natural number) to the relay drive circuits 11*a* and 11*b* at times Ta1 to Tan and Tb1 to Tbn, respectively. The time interval ΔTab of the times Ta1 to Tan and Tb1 to Tbn are adjustable by the CPU 113. In the second embodiment, the CPU 113 sets the time interval ΔTab as a fixed value. More specifically, when ΔTa and ΔTb represent the time intervals of the recovery signals Ra1 to Ran and Rb1 to Rbn, each of which is transmitted from the CPU 113, the time interval ΔTab is set to satisfy $\Delta Tab = \Delta Ta/2 = \Delta Tb/2$.

Figure 7:
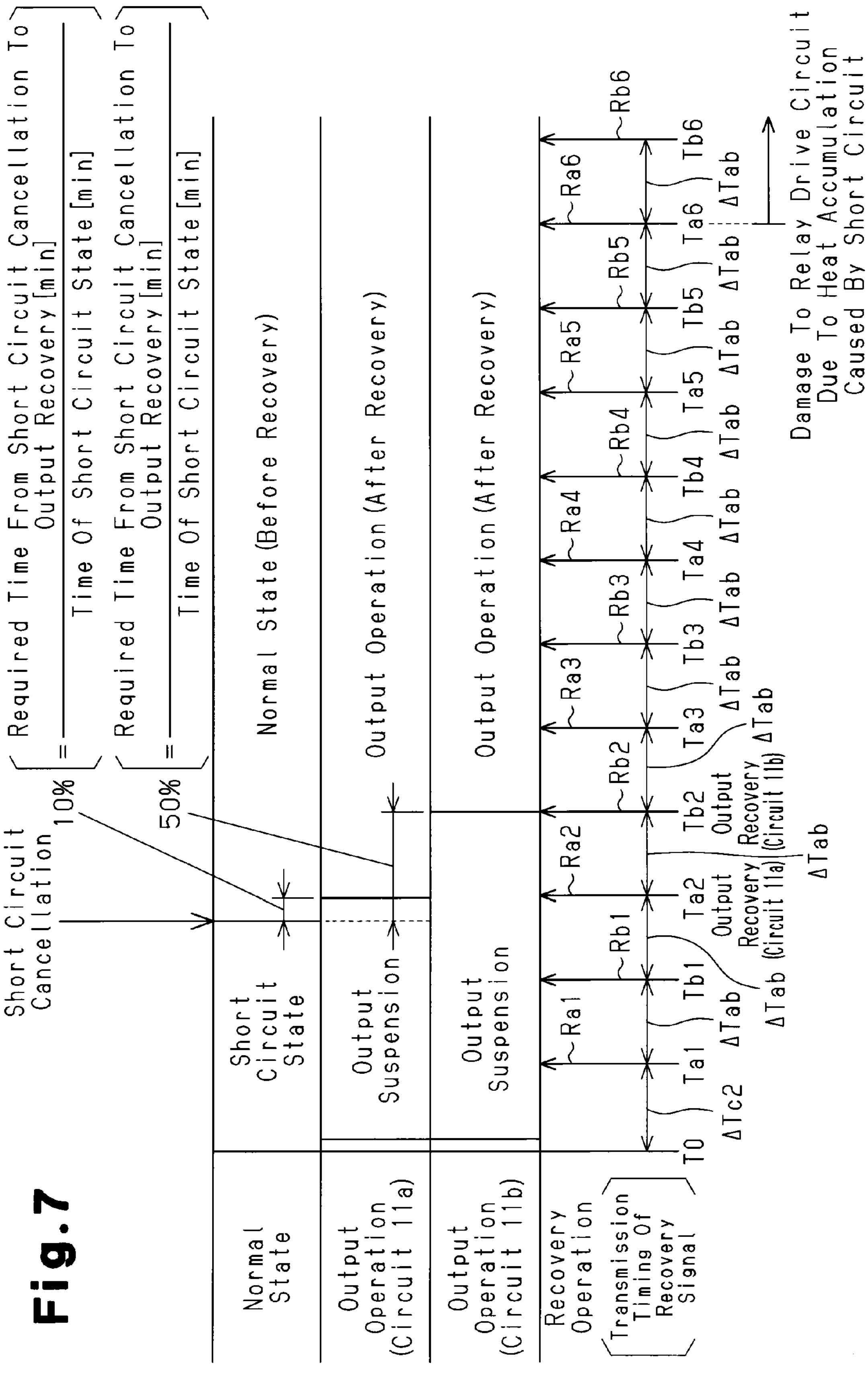
FIG. 7 is a timing chart showing the operation of the ECU in the second embodiment.

In the example shown in FIG. 7, after a short circuit is spontaneously cancelled and a normal state is recovered, the output operation of the relay drive circuit 11*a* is recovered when the short circuit detection circuit 12*a* transmits to the relay drive circuit 11*a* the recovery signal Ra2, which is transmitted at time Ta2 and is the second one of the signals transmitted from time Ta1. In this state, the recovery operation of the relay drive circuit 11*a* has been performed twice. Since the recovery operation has been performed for a frequency of only two times, which is less than six times and thus a small number, the relay drive circuit 11*a* is not damaged. In addition, the time ratio of the time [min] required from short circuit cancellation to output recovery relative to the time of the short circuit state [min] is 10% or less. Thus, the time ratio is small and satisfactory.

The output operation of the relay drive circuit 11*b* is recovered when the short circuit detection circuit 12*b* transmits to the relay drive circuit 11*b* the recovery signal Rb2, which is transmitted at time Tb2 and is the second one of the signals transmitted from time Tb1. Therefore, the recovery operation of the relay drive circuit 11*b* has been performed for a frequency of two times, which is less than six times and thus a small number, and the relay drive circuit 11*b* is not damaged. In the same manner as the first embodiment, as shown in FIG. 7, it is assumed that when the recovery signal is transmitted to the relay drive circuit 11*a* or 11*b* six times or more, the heat accumulation due to the short circuit $I_0$ damages the relay drive circuit 11*a* or 11*b*.

The ECU 1 (short circuit protection circuit) of the second embodiment has the advantages described below.

(1) The recovery signals Ra1 to Ran (where n is a natural number) from the short circuit detection circuit 12*a* serving as the first short circuit protection unit and the recovery signals Rb1 to Rbn (where n is a natural number) from the short circuit detection circuit 12*b* serving as the second short circuit protection unit are alternately transmitted to the corresponding relay drive circuits. Therefore, in comparison with the first embodiment in which only one short circuit protection unit (i.e., the relay drive circuit 11 and the short circuit detection circuit 12) are used, the recovery signals Ra1 to Ran and Rb1 to Rbn are more frequently transmitted to the relay drive circuits 11*a* and 11*b*. Thus, after a short circuit state is spontaneously cancelled, the output operation state of the relay drive circuit 11*a* (or 11*b*) is recovered within a short period of time from when the output is suspended. Further, the frequency in which the recovery signals Ra1 to Ran and Rb1 to Rbn are transmitted to the relay drive circuits 11*a* and 11*b* (frequency of recovery operation) is less than one half that of the first embodiment. This decreases the heat accumulated in the relay drive circuits 11*a* and 11*b* by the short circuit current $I_0$ and effectively prevents the relay drive circuit 11 from being damaged.

(2) The hardware structure including the two short circuit protection units (relay drive circuit 11*a* and short circuit detection circuit 12*a*, and relay drive circuit 11*b* and short circuit detection circuit 12*b*) is simple. Accordingly, the detection of a short circuit in the relay drive circuits 11*a* and 11*b* and recovery of the output operation state in the relay drive circuit 11*a* and 11*b* from the short circuit state are performed readily and automatically in an ensured manner without relying on software stored in a memory or the like of the CPU 113. This improves convenience for the vehicle user (driver etc.).

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

The signal control circuit of the short circuit detection circuit 12 is not limited to the structure formed by the transistor TR4 and the resistor R6. The short circuit detection circuit 12 may includes a signal control circuit for increasing the potential at the node between the resistors R1 and R2 based on the output of the comparator CMP1 (forcible suspension signal D).

Instead of using the CPU 13 (or 113), for example, an external circuit may be used to provide the suspension permission signal C.

The short circuit detection circuit 12 does not have to use the suspension permission signal C. For example, a control circuit that suspends transmission of the forcible suspension signal D (or shifts the level of the forcible suspension signal D) may be arranged on the short circuit detection circuit 12.

In the second embodiment, the time interval ΔTab at which the recovery signals Ra1 to Ran and Rb1 to Rbn are alternately transmitted does not have to be a constant value. For example, in the same manner as the first embodiment, the time interval ΔTab may be gradually increased whenever the recovery signals Ra1 to Ran (or Rb1 to Rbn) are transmitted so that the time ratio expressed by D2/D1, in which D1 represents the short circuit state time [min] and D2 represents the time [min] from when the short circuit is cancelled to when the output operation of the relay drive circuit 11*a* (or 11*b*) is recovered, becomes less than or equal to a predetermined value (e.g., 10% or less).

In such a case, compared with the second embodiment, the recovery signals Ra1 to Ran and Rb1 to Rbn are transmitted to the relay drive circuits 11*a* and 11*b* more frequently. That is, the total recovery signals from the aspect of the relay coil are transmitted more frequently. The recovery signals Ra1 to Ran and Rb1 to Rbn are especially transmitted more frequently when a short circuit begins to occur. Thus, after the short circuit state is spontaneously cancelled, the relay drive circuits 11*a* and 11*b* are recovered to an operational state within a short period from the output suspension state. Further, as time elapses, the transmission of the recovery signals Ra1 to Ran and Rb1 to Rbn become less frequent and decreases in a gradual manner. This further effectively suppresses the heat accumulated in the in the relay drive circuits 11*a* and 11*b* by the short circuit current $I_0$.

In the second embodiment, the ratio of the transmission timing of the recovery signals Ra1 to Ran and Rb1 to Rbn is 1:1. However, the present invention is not limited in such a manner, and the ratio of the transmission timing may be, for example, 1:2 or 1:3.

In the second embodiment, the ECU 1*a* may include three or more short circuit protection units (three or more sets of a relay drive circuit and short circuit detection circuit).

In the second embodiment, a circuit section for directly detecting a short circuit state (i.e., the comparator CMP1) may be shared by the two short circuit detection circuits 12*a* and 12*b*. In such a case, however, a discrete circuit section (i.e., the transistor TR3 and transistor TR4) for directly transmitting the recovery signals Ra1 to Ran and Rb1 to Rbn to the relay drive circuits 11*a* and 11*b* must be provided for each of the short circuit detection circuits 12*a* and 12*b*.

The present examples and embodiments are to be considered as illustrative and not restrictive, and the invention is not to be limited to the details given herein, but may be modified within the scope and equivalence of the appended claims.

What is claimed is:

1. A short circuit protection circuit comprising:

a relay drive circuit which outputs a drive current to a load in accordance with a first control signal; and a short circuit detection circuit which detects the occurrence of a short circuit at an output side of the relay drive circuit, suspends an output operation of the relay drive circuit when the short circuit occurs, and intermittently transmits a recovery signal to the relay drive circuit in a certain time interval after a predetermined time elapses from when the short circuit occurs to recover the output operation of the relay drive circuit;

wherein the time interval is gradually increased whenever the recovery signal is transmitted, the short circuit protection circuit further comprising:

a control unit which provides the relay drive circuit with the first control signal and the short circuit detection circuit with a second control signal;

wherein the short circuit detection circuit generates the recovery signal in response to the second control signal.

2. The short circuit protection circuit according to claim 1, wherein the short circuit detection circuit generates a forcible suspension signal for suspending transmission of the first control signal to the relay drive circuit, and the short circuit detection circuit intermittently suspends transmission of the forcible suspension signal to the relay drive circuit so as to transmit the forcible suspension signal to the relay drive circuit as the recovery signal when the short circuit is occurring.

3. The short circuit protection circuit according to claim 2, wherein the short circuit includes:

a comparator which generates the forcible suspension signal; and a signal control circuit which intermittently suspends transmission of the forcible suspension signal to the relay drive circuit from the comparator.

4. The short circuit protection circuit according to claim 3, wherein the signal control circuit includes:

a transistor connected to an output of the comparator, which outputs the forcible suspension signal, and an input of the relay drive circuit, which receives the first control signal; and a resistor connected between the transistor and ground.

5. The short circuit protection circuit according to claim 4, further comprising:

a control unit which provides the input of the relay drive circuit with the first control signal and provides a control terminal of the transistor with a second control signal;

wherein the control unit receives the forcible suspension signal via the transistor when the transistor is activated by the second control signal.

6. A short circuit protection circuit comprising:

a relay drive circuit which outputs a drive current to a load in accordance with a control signal; and a short circuit detection circuit which detects the occurrence of a short circuit at an output side of the relay drive circuit, suspends an output operation of the relay drive circuit when the short circuit occurs, and intermittently transmits a recovery signal to the relay drive circuit in a certain time interval after a predetermined time elapses from when the short circuit occurs to recover the output operation of the relay drive circuit;

wherein the time interval is gradually increased whenever the recovery signal is transmitted so that when D1 represents the time during which the short circuit is occurring and D2 represents the time from when the short circuit is cancelled to when the output operation of the relay drive circuit is recovered, a time ratio expressed by D2/D1 becomes less than or equal to a predetermined value.

7. A short circuit protection circuit comprising:

a first relay drive circuit which outputs a first drive current to a load in accordance with a control signal;

a second relay drive circuit which outputs a second drive current to the load in accordance with the control signal;

a first short circuit detection circuit which detects the occurrence of a short circuit at an output side of the first relay drive circuit, suspends an output operation of the first relay drive circuit when the short circuit occurs, and intermittently transmits a first recovery signal to the first relay drive circuit in a first time interval after a first predetermined time elapses from when the short circuit occurs to recover the output operation of the first relay drive circuit; and a second short circuit detection circuit which detects the occurrence of a short circuit at an output side of the second relay drive circuit, suspends an output operation of the second relay drive circuit when the short circuit occurs, and intermittently transmits a second recovery signal to the second relay drive circuit in a second time interval after a second predetermined time elapses from when the short circuit occurs to recover the output operation of the second relay drive circuit;

wherein transmission of the first recovery signal to the first relay drive circuit from the first short circuit detection circuit and transmission of the second recovery signal to the second relay drive circuit from the second short circuit detection circuit are alternately performed.

8. The short circuit protection circuit according to claim 7, wherein:

the first time interval is gradually increased whenever the first recovery signal is transmitted; and the second time interval is gradually increased whenever the second recovery signal is transmitted.

9. A method for protecting a relay drive circuit from damage caused by a short circuit, in which the relay drive circuit outputs a drive current to a load, the method comprising:

detecting the occurrence of the short circuit between the load and the relay drive circuit;

suspending an output operation of the relay drive circuit when the short circuit occurs; and intermittently transmitting a recovery signal to the relay drive circuit in a certain time interval after a predetermined time elapses from when the short circuit occurs to recover the output operation of the relay drive circuit;

wherein said intermittently transmitting a recovery signal includes gradually increasing the time interval whenever the recovery signal is transmitted so that when D 1 represents the time during which the short circuit is occurring and D2 represents the time from when the short circuit is cancelled to when the output operation of the relay drive circuit is recovered, a time ratio expressed by D2/D1 becomes less than or equal to a predetermined value.

* * * * *